United States Patent
Brink et al.

(10) Patent No.: US 12,382,920 B2
(45) Date of Patent: Aug. 12, 2025

(54) METHOD AND AN ARRANGEMENT FOR BARN CLEANING

(71) Applicant: DELAVAL HOLDING AB, Tumba (SE)

(72) Inventors: Marek Brink, Tumba (SE); Jozef Furdak, Tumba (SE); Bartlomiej Slusarczyk, Tumba (SE)

(73) Assignee: DeLaval Holding AB, Tumba (SE)

( * ) Notice: Subject to any disclaimer, the term of this patent is extended or adjusted under 35 U.S.C. 154(b) by 509 days.

(21) Appl. No.: 17/630,339

(22) PCT Filed: Jul. 24, 2020

(86) PCT No.: PCT/SE2020/050752
§ 371 (c)(1),
(2) Date: Jan. 26, 2022

(87) PCT Pub. No.: WO2021/029808
PCT Pub. Date: Feb. 18, 2021

(65) Prior Publication Data
US 2022/0272936 A1    Sep. 1, 2022

(30) Foreign Application Priority Data

Aug. 13, 2019 (SE) .................................. 1950928-0

(51) Int. Cl.
*A01K 1/01* (2006.01)
*G06V 40/10* (2022.01)

(52) U.S. Cl.
CPC ................ *A01K 1/01* (2013.01); *G06V 40/10* (2022.01)

(58) Field of Classification Search
CPC .......... A01K 1/01; A01K 1/0128; G06V 40/10
See application file for complete search history.

(56) References Cited

U.S. PATENT DOCUMENTS

| | | |
|---|---|---|
| 2002/0133899 A1 | 9/2002 | Van Den Berg |
| 2009/0288681 A1 | 11/2009 | Pastoor |
| 2017/0215371 A1 | 8/2017 | Fransen et al. |

FOREIGN PATENT DOCUMENTS

| | | | | |
|---|---|---|---|---|
| CN | 207820823 U | | 9/2018 | |
| CN | 109220825 A | * | 1/2019 | ............... A01K 1/01 |
| GB | 2529166 | | 2/2016 | |
| GB | 2534265 | | 7/2016 | |
| GB | 2534265 A | * | 7/2016 | ............... A01K 1/01 |
| SE | 0901570 | | 6/2011 | |

OTHER PUBLICATIONS

Machine translation of CN109220825A (Year: 2019).*

(Continued)

*Primary Examiner* — Douglas Lee
(74) *Attorney, Agent, or Firm* — NIXON & VANDERHYE (57) ABSTRACT

A method, a controller, a computer program and an arrangement for barn cleaning obtain, from a detection arrangement, information related to animal presence in an area in a barn and derive a measure of animal presence over time in the area in the barn based on the information. The method further includes controlling the operation of an automatic barn cleaning device based on the derived measure.

18 Claims, 4 Drawing Sheets

(56) References Cited

OTHER PUBLICATIONS

Office Action, issued in Chinese Patent Application No. 202080054803.9 dated Mar. 30, 2024.
Search Report for SE1950928-0 dated Feb. 14, 2020, 2 pages.
International Search Report for PCT/SE2020/050752 dated Oct. 21, 2020, 3 pages.
Written Opinion of the ISA for PCT/SE2020/050752 dated Oct. 21, 2020, 5 pages.

* cited by examiner

METHOD AND AN ARRANGEMENT FOR BARN CLEANING

This application is the U.S. national phase of International Application No. PCT/SE2020/050752 filed Jul. 24, 2020 which designated the U.S. and claims priority to SE Patent Application No. 1950928-0 filed Aug. 13, 2019, the entire contents of each of which are hereby incorporated by reference.

TECHNICAL FIELD

The present invention generally relates to cleaning in animal husbandry, and in particular to efficiency in regard of automatic barn cleaning.

BACKGROUND

Clean stables is a key feature in animal husbandry. Proper cleaning creates an agreeable environment for both animals and staff. Removal of animal excrements from an animal housing will herein be referred to as "barn cleaning". Further, animal excrements will herein be referred to as "manure", although there are many other words that may be used for the excrements of different animal types, etc., such as "effluents" or "droppings". Given that one cow can produce around 50 kg of manure every day, a farmer may need to automate certain parts of the cleaning in order to get the job done while still having time to handle other important issues. There are a number of different automatic solutions for cleaning an animal housing. An animal housing will herein be referred to as "a barn".

One type of automatic barn cleaning devices is so-called scrapers. Scrapers may have different sizes and shapes, and are pulled along an alley by a chain, rope, wire, or e.g. a hydraulic arrangement. The scrapers displace the manure along the alleys, e.g. such that it either is drained through a slated floor, or is displaced to a special drain where it may propagate to a sewer, or similar, leading e.g. to a manure tank or a manure lagoon. Another type of automatic barn cleaning devices is the self-propelled vehicles developed for this purpose. Such vehicles are typically battery driven, and often referred to as "manure robots", or "autonomous cleaning robots", and they are operable to either displace or to collect manure. Robotic cleaning devices may use different means for navigation. For example, induction lines or magnetic stripes could be fixed in the floor, and the self-propelled cleaning devices could be provided with sensors, which enable the vehicle to be guided by the lines or stripes. Alternatively, the navigation could be performed by means of beacons or transponders placed along a predetermined route, detectable by the self-propelled cleaning devices. The navigation means thus lead the autonomous device along a predetermined route.

A cleaning schedule for an automatic barn cleaning device is normally preprogrammed, such that the automatic barn cleaning device is started and run a fixed route at certain time periods during the day and/or night. This works well in many cases. However, the inventors want to further improve the performance of automatic barn cleaning devices.

SUMMARY

According to a first aspect, a method for barn cleaning is provided, which is to be applied by a barn cleaning control unit. The method comprises obtaining, from a detection arrangement, information related to animal presence in an area in a barn and deriving a measure of animal presence over time in said area in the barn based on said information. The method further comprises controlling the operation of an automatic barn cleaning device based on the derived measure.

The method provides a more efficient cleaning compared to other known solutions for barn cleaning. The method enables cleaning only when and where needed, instead of only running scheduled fixed cleaning sessions following a standard time table.

The measure of animal presence over time used to control the operation of the automatic barn cleaning device may be an accumulated measure of the animal presence in the area of the barn over a period of time. The measure of animal presence over time may be a degree of occupancy of (a plurality of) animals in the area of the barn. The period of time may be a period of time before controlling the automatic barn cleaning device to operate in that area of the barn, such that a period of time from a previous cleaning event in the area. The measure may thus be related to an estimate of an accumulated amount of manure produced in the area during the period of time.

According to some embodiments, the controlling comprises triggering the automatic barn cleaning device to operate in said area in the barn when the derived measure meets (i.e. exceeds) a first threshold. This enables running of the automatic barn cleaning device e.g. only when there is reason to believe that there is a certain amount of manure (excrements) present in the area.

According to some embodiments, the controlling comprises adjusting a time for a next scheduled cleaning session of the automatic barn cleaning device in the area in the barn. This enables use of the method together with and improving the performance of an, e.g. more traditional, scheduled cleaning scheme. For example, a time for a next scheduled cleaning session of the automatic barn cleaning device in the area in the barn could be postponed when the derived measure falls below a second threshold at a certain time before said next scheduled cleaning session.

According to some embodiments the detection arrangement comprises one or more cameras mounted such as to capture images of the area in the barn. This is an economically beneficial solution.

According to some embodiments the detection arrangement comprises an animal positioning system, such as a real time location system, operable to monitor the location of animals in the barn. This is a more precise solution, but typically more expensive than the camera alternative.

According to some embodiments the measure for animal presence over time is derived for a period of time starting from a latest cleaning of said area. This enables determining a measure from a point in time when the area was clean up to a present time.

According to some embodiments the deriving of a measure comprises determining of a number of animals being present in said area in the barn at different occasions over time, and deriving the measure from said respective numbers and a time between occasions.

According to some embodiments the obtained information comprises animal position information, and the deriving of a measure comprises integrating the obtained information over time.

According to some embodiments the area is a sub-area of an area of operation of the automatic barn cleaning device. Thereby, a measure of animal presence over time could be derived for a number of relatively small sub-areas, and cleaning could be performed e.g. in only some of the sub-areas where it is needed and/or desired.

According to a second aspect, a barn cleaning control unit is provided, which is operable to control an automatic barn cleaning device. The control unit is configured to obtain, from a detection arrangement, information related to animal presence in an area in a barn, and to derive a measure of animal presence over time in said area in the barn based on said information. The barn cleaning control unit is further configured to control the operation of an automatic barn cleaning device based on the derived measure.

According to some embodiments, the controlling comprises to trigger the automatic barn cleaning device to operate in said area in the barn when the derived measure meets a first threshold.

According to some embodiments, the controlling comprises to adjust a time for a next scheduled cleaning session of the automatic barn cleaning device in the area in the barn.

According to some embodiments the controlling comprises to postpone a time for a next scheduled cleaning session of the automatic barn cleaning device in the area in the barn when the derived measure falls below a second threshold at a certain time before said next scheduled cleaning session.

According to some embodiments, the deriving of a measure comprises to determine a number of animals being present in said area in the barn at different occasions over time, and wherein said measure is derived from said respective numbers and a time between occasions.

According to some embodiments, the obtained information comprises animal position information, and the deriving of a measure comprises integrating the obtained information over time.

According to some embodiments, the area is a sub-area of an area of operation of the automatic barn cleaning device.

According to a third aspect, a computer program is provided, comprising comprising instructions, which, when executed by at least one processing circuitry of a barn cleaning control unit according to the second aspect, causes the barn cleaning control unit to carry out the method according to the first aspect.

According to a fourth aspect, a barn cleaning arrangement is provided, which comprises a detection arrangement; an automatic barn cleaning device and a barn cleaning control unit according to the second aspect. The detection arrangement could be one or more cameras or an animal positioning system.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

In a barn where animals, such as dairy or meat animals are kept, there will be manure. Some animals produce more manure than others, but as an example, one cow can produce about 50 kg of manure per day, which makes the requirements on manure handling equipment very high. It is typically desired to keep animal housings clean, and there are different types of automatic barn cleaning devices which can assist in this task.

Embodiments of the subject matter described herein could with advantage be used for achieving a more adequate automatic barn cleaning. For example, cleaning can be performed in an area only when, and just when it is needed, instead of running prescheduled cleaning sessions when there is no need, or, waiting another hour for cleaning according to schedule when animals are standing in pools of manure.

Exemplifying Embodiments of Method, FIGS. 1-5

Below, exemplifying embodiments of a method will be described with reference to FIGS. 1-5. The embodiments are intended to be performed by a barn cleaning control unit which is associated with an automatic barn cleaning device. The term "associated with" is here intended to cover at least that the control unit is operatively connected to the automatic barn cleaning device. The control unit will be described in more detail further below in association with FIG. 6. An example of an automatic barn cleaning device is e.g. a scraper pulled by a wire or a hydraulic arrangement, or a self-propelled robot operable to clear a barn from manure, e.g. by displacing or collecting the manure. The automatic barn cleaning device is suitable for automatic cleaning of a barn in which animals are kept, such as e.g. cows, buffalos, sheep or goats.

Figure 1:
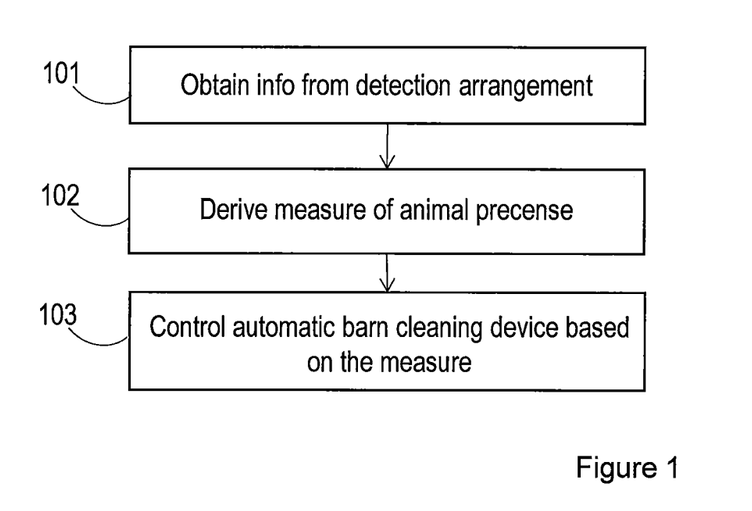
FIGS. 1-5 are flow charts illustrating a method according to exemplifying embodiments.

FIG. 1 shows an exemplifying general method embodiment for barn cleaning to be applied by a barn cleaning control unit. The method illustrated in FIG. 1 comprises an action 101, of obtaining information related to animal presence in an area in a barn. The area may be assumed to comprise an area of operation of an automatic barn cleaning device. The method in FIG. 1 further comprises an action 102, of deriving a measure of animal presence over time in said area in the barn based on said information. The method in FIG. 1 further comprises an action 103, of controlling the operation of an automatic barn cleaning device based on the derived measure.

The information is obtained from a detection arrangement which could be either camera based, or be positioning system based. These different types will be further described below. Information may be obtained intermittently, at a plurality of occasions, or more continuously. The information could be or include e.g. images, parameters derived from images or coordinates of ID-tags attached to animals. The deriving of a measure could thus include integrating, or accumulating, an animal presence in an area over time. It may be a measure of the degree of occupancy of animals in the area of the barn, such that a degree of mean occupancy during a period of time, such that since a previous cleaning event in that area. In an exemplifying embodiment, the information is obtained at certain intervals, such as every 1-5 minutes. Thereby, a measure of the animal presence over time could be derived e.g. as a sum of the number of animals present at each occasion of obtaining information, times the time T between these occasions, i.e. $\Sigma Numbe_i*T$. Thus, if obtaining the information at a first, second and third occasion that 100, 89, 74 animals, respectively, was present with 5 minutes between the occasions, this would give a measure of $(100+89+74)*5=263*5=1315$ animal minutes. When having a more frequent, or even continuous obtaining of information, the measure of animal presence may be derived e.g. as a sum of the time periods an (or each) animal has spent in the area during a period of interest, such as $\Sigma t_n$. In other words, when, during a half hour of interest, 50 animals have been present in the area the full half hour, 25 animals have been present 10 minutes each and 45 animals were present 7 minutes each, the measure would be 50*30+25*10+45*7=1500+250+315=2065 animal minutes. Assuming in this case that the total number of animals in the barn was 200, the maximum measure of animal presence in the area during the 30 minutes would be 200*30=6000 animal minutes. Thus the degree of occupancy could be calculated as 2065/6000, i.e. about 34%. The unit for the measure may thus be e.g. animal minutes, percentage, or similar. The measure may thus be related to an estimate of an accumulated amount of manure produced in the area during the amount of animal-minutes. Assuming that the animals are cows and that each cow produces 50 kg of manure per 24 hours, (for simplicity, it is here assumed that it is evenly distributed over the 24 hours) gives that each cow produces 0.035 kg manure per minute (in average over time). Thus, a measure of 2065 animal minutes in an area of interest during a time of interest would correspond to approximately 72 kg of manure in this area after that time, according to this simplified calculation. The measure could be derived for a larger area, such as a whole alley, or for a smaller area, such as a sub-area of an alley. This is further illustrated in FIG. 6.

Figure 2:
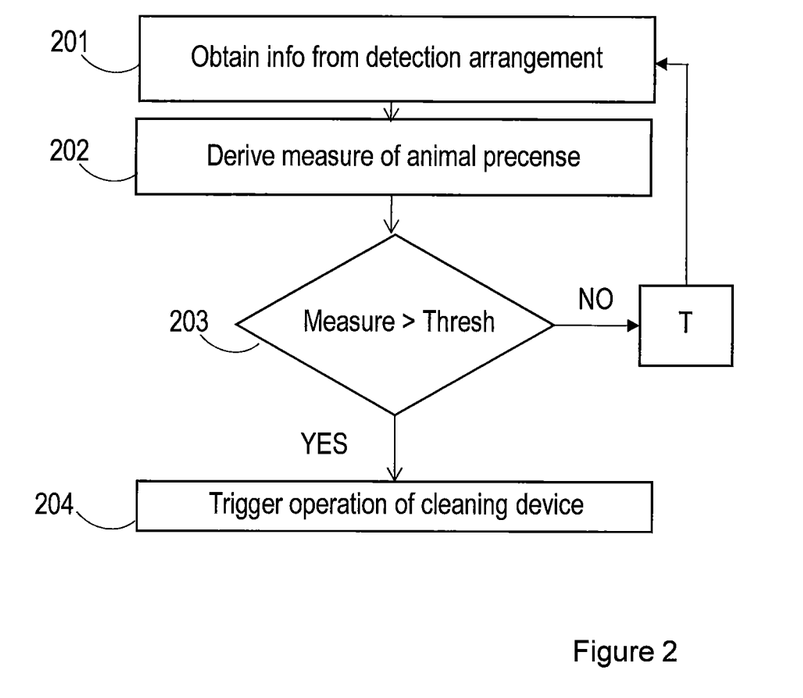

The controlling of the operation of an automatic barn cleaning device based on the derived measure may comprise different alternatives or different combinations of alternatives. For example, the controlling could involve triggering, e.g. somehow inducing by direct or indirect control signaling, an automatic barn cleaning device to start a barn cleaning operation when the derived measure is found to fulfill a criterion such as meeting a threshold value, e.g. reaching or exceeding a measure corresponding to about 20 kg of manure (or 571 animal minutes according to calculation above). This alternative is illustrated in FIG. 2. Note that the thresholds could vary during different times of day and night.

FIG. 2 shows an exemplifying embodiment of the method illustrated in FIG. 1. The method illustrated in FIG. 2 comprises an action 201, of obtaining information related to animal presence in an area in a barn. The area may, as before, be assumed to comprise an area of operation of an automatic barn cleaning device. The method in FIG. 2 further comprises an action 202, of deriving a measure of animal presence over time in said area in the barn based on said information. FIG. 2 further comprises an action 203, of determining (evaluating) whether the derived measure meets a threshold, in FIG. 2 exemplified by whether the measure exceeds a threshold "Thresh". Depending on how the derived measure is construed, the value of the threshold and the relation to the threshold may be different than this illustrated example. However, when the derived measure reflects e.g. a total number of "animal minutes" spent in the area since a last cleaning session, it would be logical to evaluate whether the derived measure exceeds (or equals) a threshold value, in animal minutes, which corresponds to an estimated accumulated amount of manure suitably large to run a cleaning session. FIG. 2 further comprises an action 204, of controlling the operation of an automatic barn cleaning device based on the derived measure, e.g. triggering the automatic barn cleaning device to operate in the area in the barn when the derived measure meets the threshold in action 203, e.g. exceeds a predefined threshold.

When the derived measure is found NOT to meet the threshold in action 203, the automatic barn cleaning device is not triggered to initiate operation (at least not by the functionality described in this example). In FIG. 2 this is illustrated in an exemplifying manner, as a delay "T" before a new round of obtaining 201 and deriving 202, etc. is performed. For example, T could be set to one, five, ten or 20 minutes, depending on a preferred level of cleanliness, and/or on the time of day.

The threshold value for deciding when to trigger operation of a cleaning device could be set by a farmer according to preference or need. A higher allowed measure of animal presence in an area leads to that the cleaning device will be triggered into action more seldom, which may be advantageous from an energy consumption perspective, but also means that more manure is allowed to accumulate before cleaning. A suitable threshold value could be selected after observing derived measures of animal presence over one or more 24-hour periods and correlating that with an observed amount of accumulated manure. Based on these measures, it could be concluded what threshold would lead to a sufficient level of cleanliness in the stable. Thereby, it may be ensured that cleaning is performed according to actual need, and not only based on guessing or assumptions. If almost no animals are present in the area during a period of time, no unnecessary cleaning will be executed.

Figure 3:
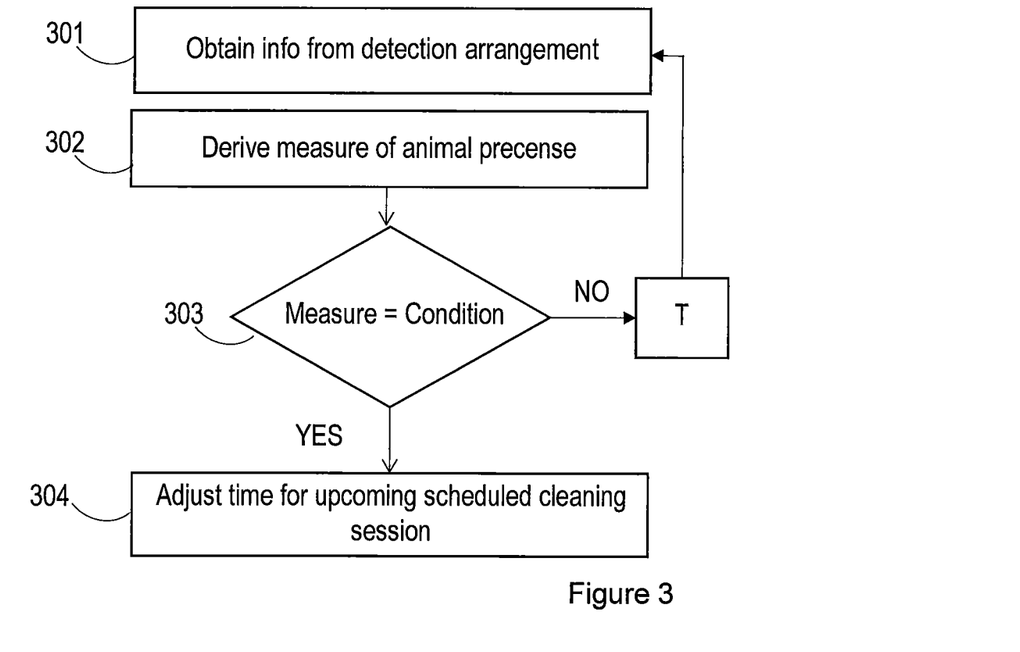

FIG. 3 shows an exemplifying method embodiment, comprising the actions 301, 302 which may correspond to the actions with similar names in previous embodiments. The method in FIG. 3 further comprises an action 303, of determining (evaluating) whether the derived measure fulfills a criterion, e.g. meets a threshold. There may be further conditions to be evaluated in action 303, which will be described in association with FIG. 4. FIG. 3 further comprises an action 304, of adjusting a time for a next scheduled (planned) cleaning session of the automatic barn cleaning device in the area in the barn, when the derived measure fulfills the criterion in action 303.

This embodiment may advantageously be applied in combination with another cleaning control scheme, for example a preprogrammed scheme in which the automatic barn cleaning device is started and run at predetermined times during the day and night. As previously mentioned, such other schemes may work quite well, at least as long as the animals behave in the same way every day. The embodiments described herein work also when animals change their behavior. Thus, the method in FIG. 3 may be implemented in different ways, in that the adjustment of a scheduled time could be either forward or backward in time. This embodiment enables use of another cleaning scheme as a base, and kicks in when conditions change, to ensure that the barn is cleaned when needed.

Figure 4:
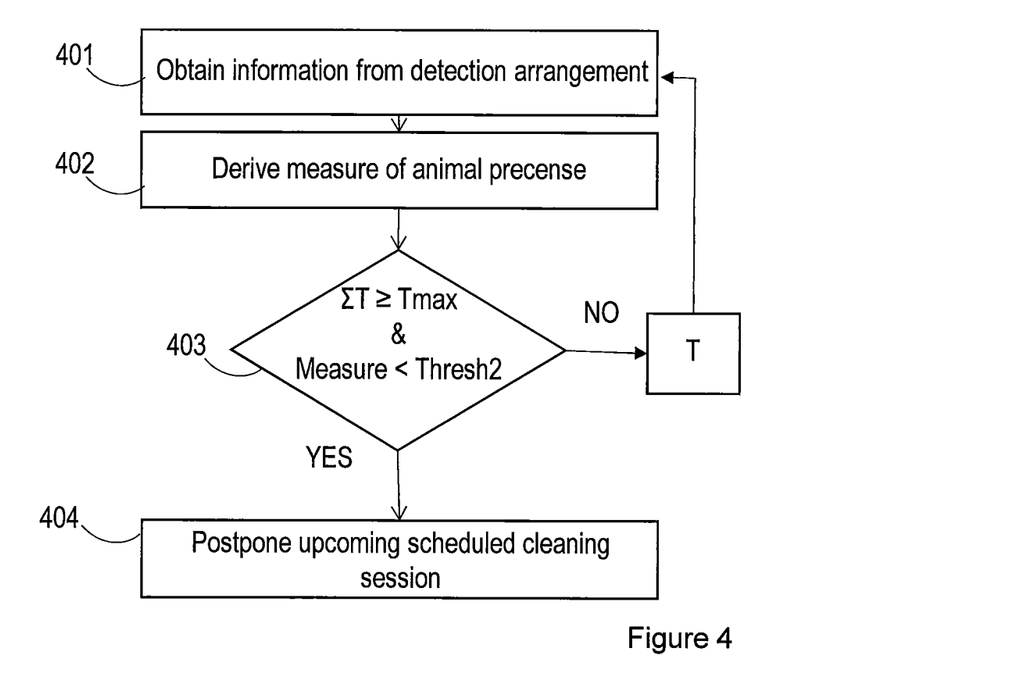

FIG. 4 illustrates a method embodiment related to adjusting a time for a next scheduled (planned) cleaning session of the automatic barn cleaning device (as in FIG. 3). The actions 401 and 402 may be assumed to correspond to the actions with similar names in previous embodiments. Here, the illustrated method comprises an action 403 of evaluating the derived measure against a threshold and evaluating the length of a time period. The purpose of action 403 is to find out whether it is really motivated to run the next cleaning session as planned. When the animals have not been around that much in the area (derived measure falls below a threshold) during a certain time (expressed e.g. as: since a last cleaning session or when a time to next scheduled cleaning session is shorter than a predefined value). FIG. 4 further comprises an action 405 of postponing a time for a next scheduled cleaning session of the automatic barn cleaning device in the area in the barn when the derived measure falls below a second threshold at a certain time before said next scheduled cleaning session. By postponing a next cleaning session, energy and ware on machinery can be saved. For example, during summer in the Scandinavian countries, animals are let out for pasture, while they still have access to the barn in order to be able to visit an automatic milking station and/or to eat additional feed (i.e. in addition to the grazing). During such times, the animal presence over time in the barn may vary substantially from day to day and even hour to hour, depending on things like weather or temperature. Thereby, the need for cleaning also varies, which can be adhered to by the embodiments suggested herein.

Figure 5:
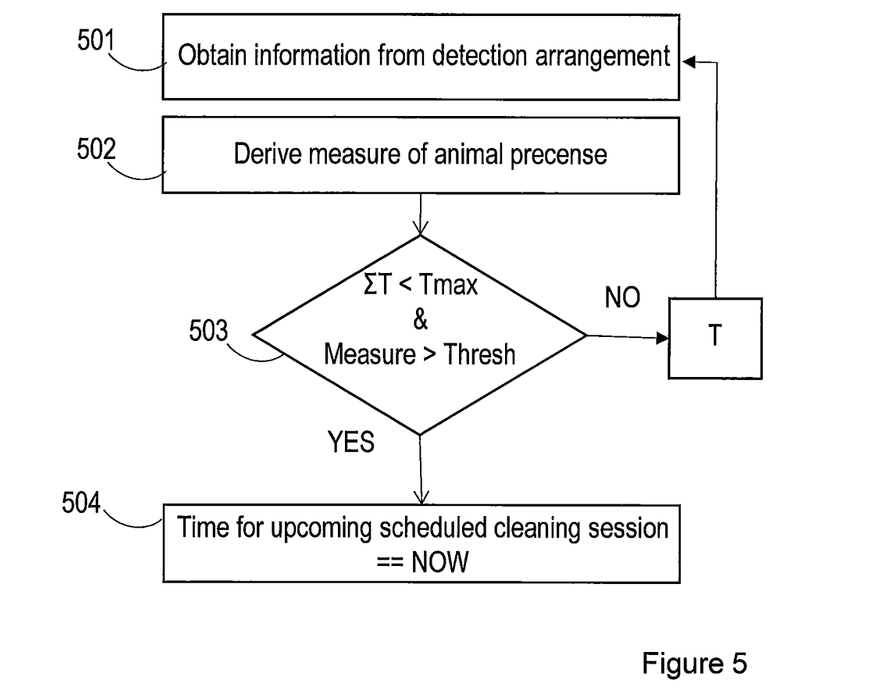

FIG. 5 also illustrates a method embodiment related to adjusting a time for a next scheduled cleaning session of the automatic barn cleaning device (as in FIGS. 3 and 4). The actions 501 and 502 may be assumed to correspond to the actions with similar names in previous embodiments. As in FIG. 4, the illustrated method comprises an action 503 of evaluating the derived measure against a threshold and evaluating the length of a time period. The purpose of action 503 is to find out whether cleaning should take place before an upcoming prescheduled cleaning session is going to take place. FIG. 5 further comprises an action 505 of resetting the time of the upcoming cleaning session to "NOW", or a value representing "within shortly".

The difference of this method to the one illustrated e.g. in FIG. 2 is the explicit coordination with an existing cleaning schedule. The effect when executing the method is that a cleaning session of the automatic barn cleaning device is started when the derived measure exceeds a threshold, as in FIG. 2, and that it is a planned cleaning session that is advanced in time, i.e. is run earlier than planned. This enables that further scheduled cleaning sessions could be adapted accordingly, e.g. be similarly advanced in time.

For all embodiments derived herein, the measure of animal presence may be derived e.g. from the time of a latest cleaning session, e.g. from the end of such a session, and up to a present time. Other time intervals are also possible. Different sub-areas may have different times since a latest cleaning, due e.g. to that a part of an area of operation of the automatic barn cleaning device was not cleaned during a recent cleaning session.

The detection arrangement can as previously mentioned be of different types. One alternative is that the detection arrangement comprises one or more cameras, which should be mounted such as to capture images of the area in the barn. Such cameras could be mounted e.g. on a wall or in the ceiling, and be directed such that they capture images of the area of interest (comprising an area of operation of an automatic barn cleaning device, e.g. an alley, several alleys in the barn, or all areas of the barn where the animals are allowed to move, and thus that may be subjected to manure). The obtained information could in this case be these images, or at least some features derived from these images. The obtained information may then be processed by image or feature processing software run on a processing unit, which may perform object recognition in regard of animals present in the area. Thereby, a number of animals present could be determined in real-time, or close to real-time and a measure could thus be derived based on such observations over time. It is not necessary to know which individual animals that are present, only that a certain amount of animals have been present in the area during a certain time. The advantage of this example is that it is relatively simple to install and that it does not require expensive positioning systems, or even that the animals are provided with identification tags. It should be noted that positioning information, at least a rough one, could be obtained also when one or more cameras are used as detection arrangement. This requires that the field of view of each camera is related to some coordinate system connected to the area in the barn, such that a position in the field of view has a correlation with a position in an area of operation of the automatic barn cleaning device in the barn.

The camera or cameras used could be standard 2D cameras, such as "RGB" cameras, thermographic cameras, or even 3D cameras. Thermographic cameras, capturing e.g. infrared light, could be beneficial for night vision.

The detection arrangement could alternatively comprise or be composed of a positioning system, such as a so-called Real Time Location System (RTLS). Such systems could involve a set of antennas tracking tags attached to the animals. Thereby, the location of each animal can be tracked and monitored in real time. In such a case, the obtained information in embodiments described herein could be or comprise e.g. identification numbers and coordinates of animals located within the area. The area could be defined by a set of coordinates provided to the barn cleaning control unit, or to the positioning system. This alternative will give a more exact measure of animal presence that the camera alternative. Therefore, this would be a beneficial alternative in cases where a positioning system is already in place, or will be used also for other purposes.

Figure 6:
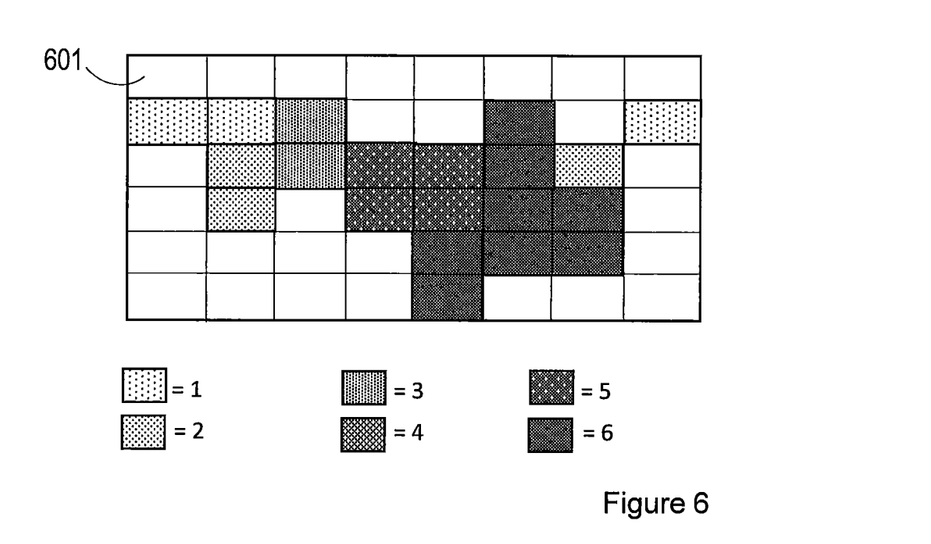
FIG. 6 is an illustration of a measure of animal presence over time

FIG. 6 illustrates a measure of animal presence over time in an area of operation of an automatic barn cleaning device. The area of operation is illustrated from above, and is illustrated as divided into sub-areas 601, and the different textures indicate different groups, or levels, of measures of animal presence over a time period T6. In this example, the obtained information from the detection arrangement would have comprised information about animal positions, and thus it may be determined more precisely what positions/locations (sub-areas), e.g. in an alley in the barn, that the animals have visited more or less. A denser pattern illustrates a more frequented area, i.e. a higher derived measure of animal presence during the time T6. As an example, we may assume that a threshold for activation of an automatic barn cleaning device here lies within level 6 of animal presence, and that this threshold value has been reached in a number of sub-areas 601 after the time period T6. Thus, in response to that the measure for some sub-areas reach the predetermined threshold, an automatic barn cleaning device could be controlled to start cleaning, either the whole alley, or selected parts of the alley, such as the sub-areas for which a (any) measure has been derived during the time T6, or the sub-areas for which a "higher" measure, e.g. of level 4-6, has been derived. The time will be reset after cleaning. The time could be reset e.g. only for the sub-areas that are cleaned by the automatic barn cleaning device (and the sub-areas which had no animal presence during T6), while the rest of the sub-areas may continue counting time from T6.

Figure 7A:
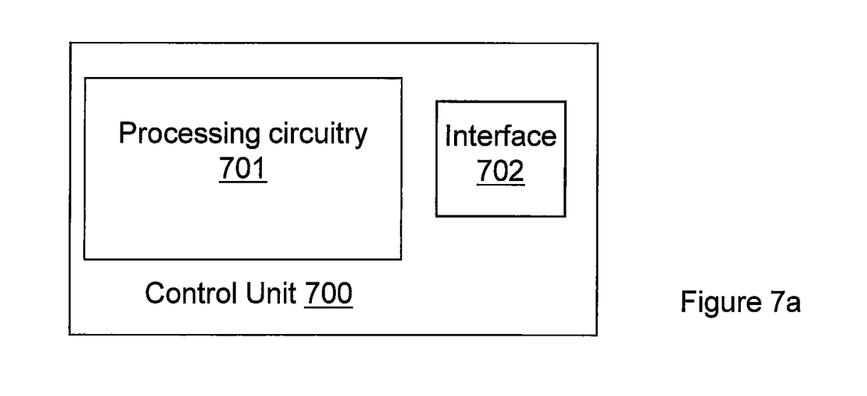
FIGS. 7a-7b are schematic block diagrams illustrating implementations of a control unit, CU, according to exemplifying embodiments.

An exemplifying embodiment of a control unit is illustrated in a general manner in FIG. 7a.

The control unit 700 should be considered as a functional unit, which may be implemented by one or several physical units. In other words, the control unit is in some embodiments a control arrangement. For example, the control unit could be a part of a central system or arrangement for controlling a plurality of barn equipment.

The control unit is operable to obtain information related to animal presence in an area in a barn from a detection arrangement; deriving a measure of animal presence over time in the area based on the obtained information; and to control the operation of an automatic barn cleaning device based on the derived measure.

The communication between the control unit and other entities may be performed over a state of the art wireless and/or wired interface 702. The control unit 700 is configured to perform the actions of at least one of the method embodiments described above. The control unit 700 is associated with the same technical features, objects and advantages as the previously described method embodiments. The control unit will be described in brief in order to avoid unnecessary repetition.

Figure 7B:
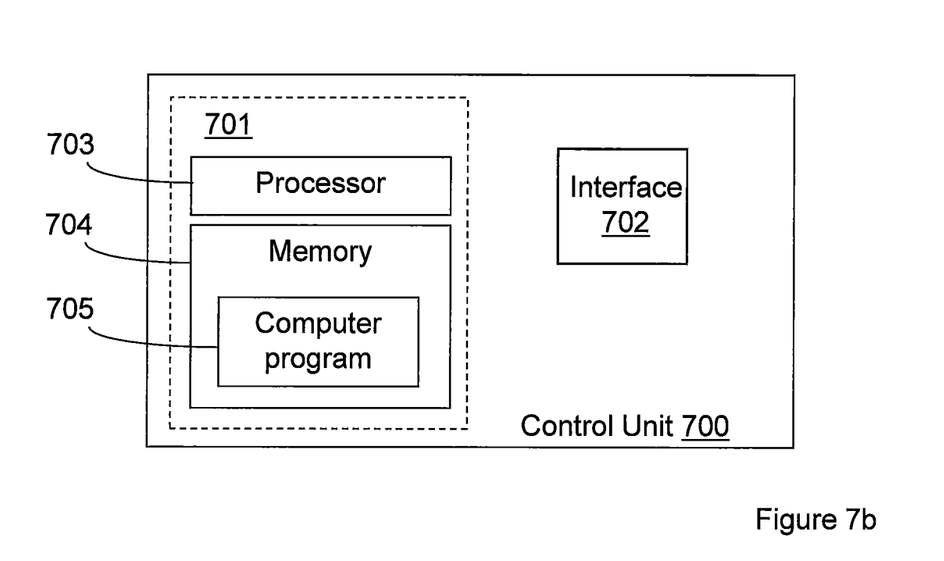

The control unit may be implemented and/or described as follows, FIG. 7b:

The control unit 700 comprises hardware and software. The hardware, or processing circuitry 701, is for example various electronic components on a for example a Printed Circuit Board, PCB. The most important of those components is typically a processor 703, for example a microprocessor, along with a memory, 704, for example EPROM or a Flash memory chip.

The control unit 700 comprises a communication interface 702, for example I/O interface or other communication bus. The interface 702, includes a wireless, and possibly a wired, interface for sending data, such as commands, to other nodes or entities, and for obtaining/receiving information from other nodes or entities.

The memory 704, which is in communication with the processor 703, that stores or holds instruction code readable and executable by the processor 703. The instruction code stored or held in the memory may be in the form of a computer program 705, which when executed by the processor 703 causes the control unit 700 to perform the actions in the manner described above.

The terminology used in the description of the embodiments as illustrated in the accompanying drawings is not intended to be limiting of the described method; control unit or computer program. Various changes, substitutions and/or alterations may be made, without departing from disclosure embodiments as defined by the appended claims.

The term "or" as used herein, is to be interpreted as a mathematical OR, that is, as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as for example a processor may fulfil the functions of several items recited in the claims.

The invention claimed is:

1. A method for barn cleaning to be applied by a barn cleaning controller, the method comprising:
    obtaining, from a detection arrangement, information related to a plurality of animals of a cumulative animal presence in an area in a barn;
    deriving a measure of the cumulative animal presence over time in said area in the barn based on said information; and
    controlling the operation of an automatic barn cleaning device based on the derived measure,
    wherein the controlling comprises:
    adjusting a time for a next scheduled cleaning session of the automatic barn cleaning device in the area in the barn,
    wherein the deriving the measure comprises:
    determining a number of the animals present in said area in the barn at different occasions over time, said measure being derived from said respective numbers and a time between the different occasions.

2. The method according to claim 1, wherein the controlling comprises triggering the automatic barn cleaning device to operate in said area in the barn when the derived measure meets a first threshold.

3. The method according to claim 1, wherein the controlling comprises:
    postponing a time for the next scheduled cleaning session of the automatic barn cleaning device in the area in the barn when the derived measure falls below a second threshold at a certain time before said next scheduled cleaning session.

4. The method according to claim 1, wherein the detection arrangement comprises one or more cameras mounted to capture images of the area in the barn.

5. The method according to claim 1, wherein the detection arrangement comprises an animal positioning system that is a real-time location system operable to monitor the location of the animals in the barn.

6. The method according to claim 1, wherein said measure is derived for a period of time starting from a latest cleaning of said area.

7. The method according to claim 1, wherein the area is a sub-area of an area of operation of the automatic barn cleaning device.

8. A non-transitory computer-readable medium on which is stored a computer program comprising instructions, which, when executed by at least one processing circuitry of a barn cleaning controller, causes the barn cleaning controller to carry out the method according to claim 1.

9. A barn cleaning controller operable to control an automatic barn cleaning device,
    wherein the barn cleaning controller is configured to:
    obtain, from a detection arrangement, information related to a plurality of animals of a cumulative animal presence in an area in a barn,
    derive a measure of the cumulative animal presence over time in said area in the barn based on said information, and control the operation of an automatic barn cleaning device based on the derived measure, and
    wherein the barn cleaning controller is further configured to:
    determine a number of animals being present in said area in the barn at different occasions over time, said measure being derived from said respective numbers and a time between occasions.

10. The barn cleaning controller according to claim 9, wherein the barn cleaning controller is further configured to:
    trigger the automatic barn cleaning device to operate in said area in the barn when the derived measure meets a first threshold.

11. The barn cleaning controller according to claim 9, wherein the barn cleaning controller is further configured to:
    adjust a time for a next scheduled cleaning session of the automatic barn cleaning device in the area in the barn.

12. The barn cleaning controller according to claim 9, wherein the barn cleaning controller is further configured to:
    postpone a time for a next scheduled cleaning session of the automatic barn cleaning device in the area in the barn when the derived measure falls below a second threshold at a certain time before said next scheduled cleaning session.

13. The barn cleaning controller according to claim 9, wherein the area is a sub-area of an area of operation of the automatic barn cleaning device.

14. A barn cleaning arrangement, comprising:
the barn cleaning controller according to claim 9;
the detection arrangement; and
the automatic barn cleaning device.

15. The barn cleaning arrangement according to claim 14, wherein the detection arrangement comprises one or more cameras mounted to capture images of the area in the barn.

16. The barn cleaning arrangement according to claim 14, wherein the detection arrangement comprises an animal positioning system that is a real-time location system operable to monitor the location of animals in the barn.

17. A method for barn cleaning to be applied by a barn cleaning controller, the method comprising:
obtaining, from a detection arrangement, information related to a plurality of animals of a cumulative animal presence in an area in a barn;
deriving a measure of the cumulative animal presence over time in said area in the barn based on said information; and
controlling the operation of an automatic barn cleaning device based on the derived measure,
wherein the controlling comprises:
adjusting a time for a next scheduled cleaning session of the automatic barn cleaning device in the area in the barn,
wherein the obtained information comprises animal position information, and
wherein the deriving of the measure comprises integrating the obtained information over time.

18. A barn cleaning controller operable to control an automatic barn cleaning device,
wherein the barn cleaning controller is configured to:
obtain, from a detection arrangement, information related to a plurality of animals of a cumulative animal presence in an area in a barn,
derive a measure of the cumulative animal presence over time in said area in the barn based on said information, and
control the operation of an automatic barn cleaning device based on the derived measure, and
wherein the obtained information comprises animal position information; and wherein the deriving of a measure comprises integrating the obtained information over time.

* * * * *